United States Patent [19]

Ghaznavi

[11] 4,360,347
[45] Nov. 23, 1982

[54] MATHEMATICAL EDUCATIONAL GAME DEVICES

[76] Inventor: Mansour Ghaznavi, 1020 University Blvd., Silver Spring, Md. 20903

[21] Appl. No.: 243,971

[22] Filed: Dec. 31, 1980

[51] Int. Cl.³ .......................... G09B 19/02; A63F 9/00
[52] U.S. Cl. .................................... 434/198; 434/208; 273/272; 273/157 R
[58] Field of Search .............. 434/198, 200, 208, 348, 434/304; 273/153 R, 156, 157 R, 272

[56] References Cited

U.S. PATENT DOCUMENTS

| | | | |
|---|---|---|---|
| 530,836 | 12/1894 | Gottsch | 434/198 |
| 802,807 | 10/1905 | Fitch | 434/304 |
| 2,202,078 | 5/1940 | Bartelt | 273/153 R |
| 2,320,832 | 6/1943 | Schoenberg et al. | 434/191 X |
| 2,645,038 | 7/1953 | Merrill | 434/348 |
| 2,655,738 | 10/1953 | Shapiro et al. | 434/348 X |
| 2,811,360 | 10/1957 | Cohen | 273/272 |
| 2,965,980 | 12/1960 | Day | 434/198 |
| 2,981,009 | 4/1961 | Lindquist | 273/156 |
| 3,103,750 | 9/1963 | Werner | 434/344 |
| 3,267,590 | 8/1966 | Browning | 434/200 X |
| 3,541,707 | 11/1970 | Billingsley | 434/198 X |
| 3,720,008 | 3/1973 | Hutar | 434/430 |
| 3,904,207 | 9/1975 | Gold | 273/272 |

FOREIGN PATENT DOCUMENTS 1304882  1/1973  United Kingdom ................ 273/272

*Primary Examiner*—William H. Grieb
*Attorney, Agent, or Firm*—Lowe, King, Price & Becker

[57] ABSTRACT

A two dimensional educational game device (10) in accordance with a first embodiment of the invention includes a plurality of flat rectangular members (15, 30) having arcuate front and rear ends (21, 25) and non-parallel opposite sides (23, 23a) such that said members, when properly interfitted, form a circular pattern. Each member (15) has a number of arithmetic operator printed thereon to establish an array of radially and circumferentially correct mathematical equations. A three dimensional educational device (40) in accordance with a second embodiment of the invention includes a plurality of stackable trays (45) having a circumferential flange (51) extending around each tray (45). Rectangular block shaped members (60) are circumferentially positioned in each tray. Each member (60) includes an outwardly extending surface portion (64) having upper and lower inclined surfaces (66, 68). Numbers or arithmetic operators printed on the outwardly extending surfaces form horizontal and longitudinally correct arithmetic equations when the members (60) are properly positioned on the trays and the trays are properly stacked.

15 Claims, 10 Drawing Figures

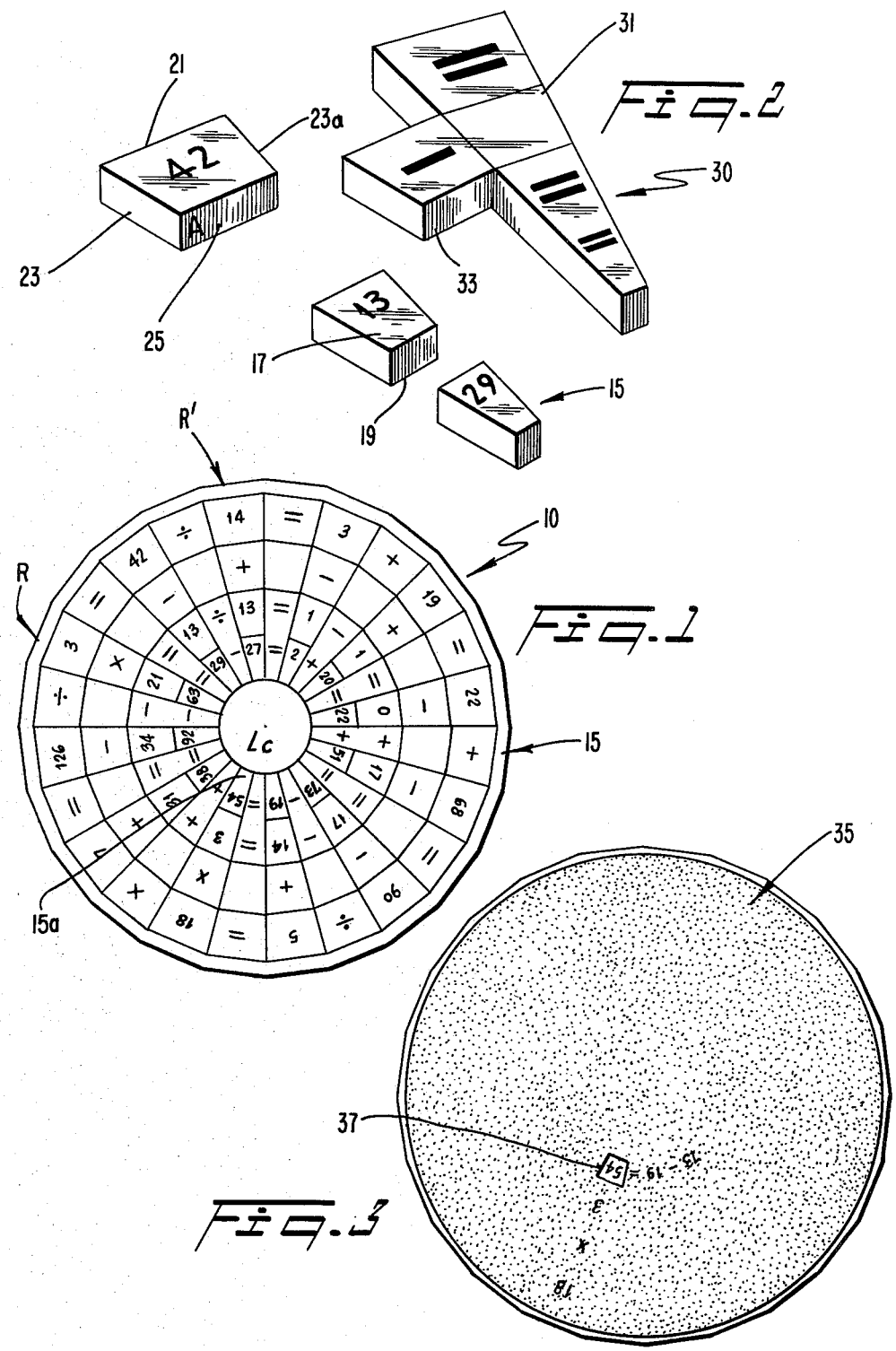

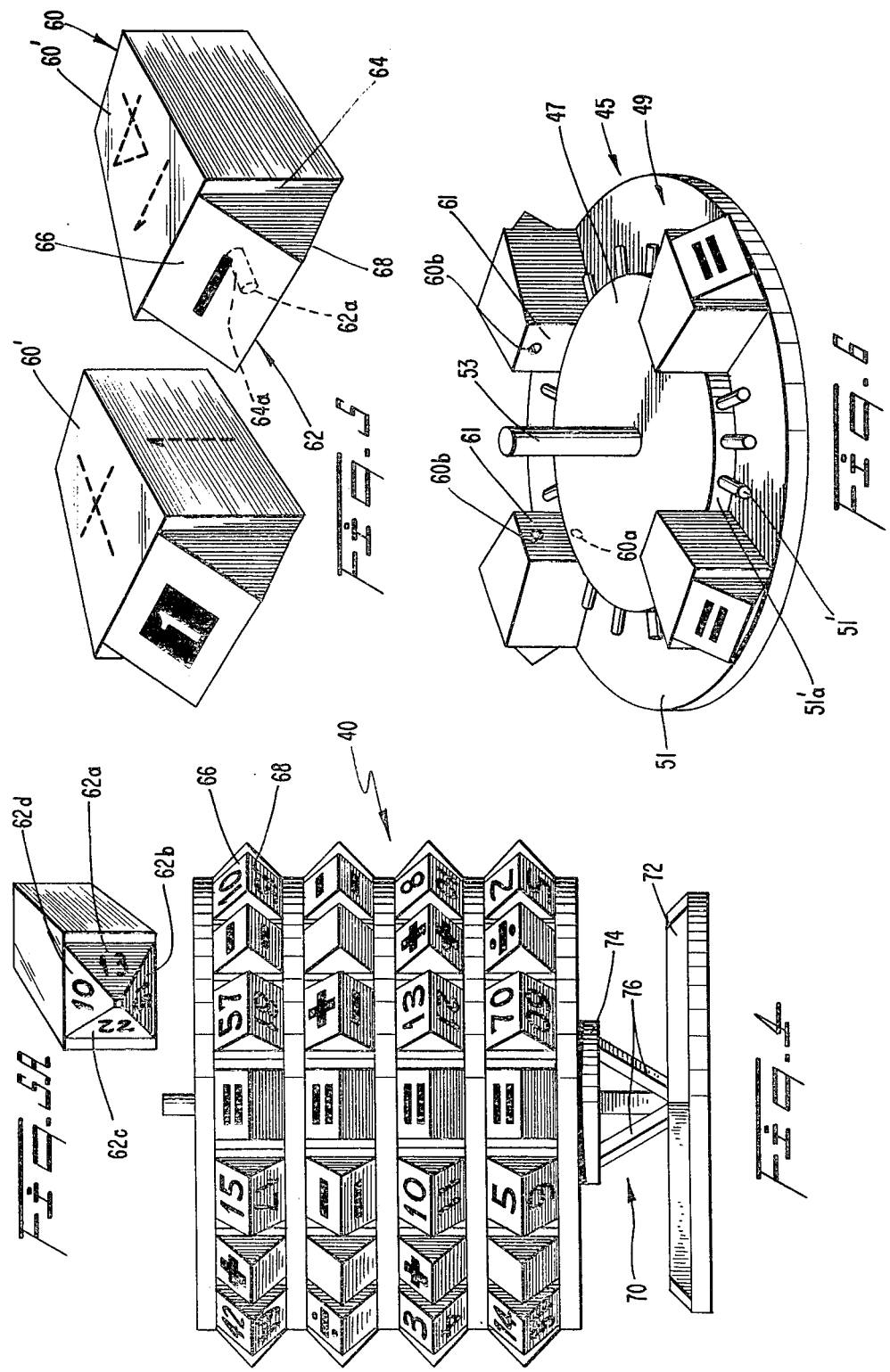

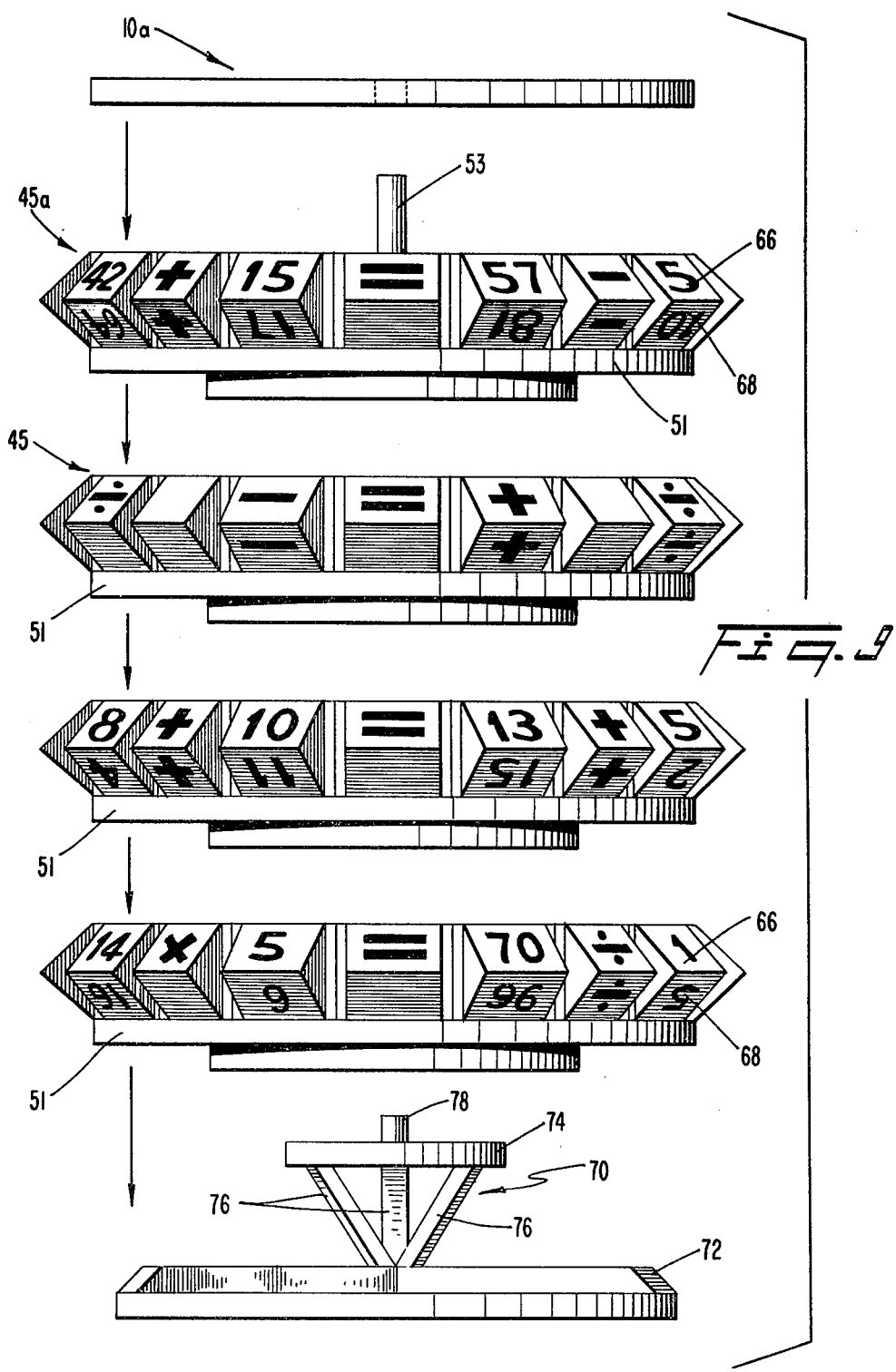

MATHEMATICAL EDUCATIONAL GAME DEVICES

TECHNICAL FIELD

This invention relates generally to educational games, and more particularly to numerical game devices useful for teaching basic arithmetic.

BACKGROUND ART

Fundamental mathematical operations, namely, addition, subtraction, multiplication and division, are taught to young children during their early years of elementary education. Various types of numerical games are known as an aid to teaching such children simple arithmetic equations. For example, flash cards, wherein a simple equation such as "3 times 3" is displayed on a front surface of the card with the answer on the rear surface, have been employed as a useful aid. A single card usually contains one equation, and a large number of cards are required to effectively aid the student. These cards can be misplaced or lost, and may also be bulky to handle or transport.

Various unitary structures for teaching simple arithmetic have been developed. In U.S. Pat. No. 2,965,980 to Day, for example, there is disclosed a numerical wheel having printed numbers aligned in circumferential rows and radial columns. Five numbers appear in each radial column. The inner and outer numbers in each column are identical, as are radially adjacent inner and outer numbers. The middle number in each column is the sum of the two adjacent numbers in the respective columns reading either radially outwardly or inwardly. A rotatable mask covers the wheel enabling the student to hide from view only certain numerals and thereby to repetitively practice addition or subtraction equations. A similar numerical wheel aid is disclosed in U.S. Pat. No. 3,103,750 to Werner. The wheel includes a circumferential multiplication table and is covered with a suitably apertured mask.

Because numerical wheels have a limited number of arithmetic equations printed in only one direction, a number of numerical wheels must be purchased to challenge the student with different arithmetic equations. Furthermore, such prior art devices often teach only addition and/or subtraction, and do not include multiplication or division, making it difficult for students to inter-relate these operations. In addition, many prior art devices limit participation by the student to "dialing in" a single arithmetic equation to obtain the answer.

It is accordingly an object of the present invention to provide a mathematical, educational game device employing different numbers and arithmetic operators forming mathematically correct equations in two directions.

Another object of the invention is to provide a mathematical device capable of being preassembled and covered with a suitably apertured mask enabling students to ascertain the mathematical solution to at least two mathematical equations employing different arithmetic operators.

Yet another object is to provide a game wherein the student interfits members together as a puzzle to form a circular pattern, by identifying arithmetic operators and numbers to form mathematically correct equations in radial and circumferential directions.

Still another object is to provide a three dimensional educational device forming mathematically correct equations in two planar directions.

DISCLOSURE OF INVENTION

A two dimensional educational and puzzle device, in accordance with one embodiment of the invention, comprises a plurality of interfitting members forming a circular pattern when properly assembled. Each member includes a number or arithmetic operator printed on its upper surface such that the numbers and operators form radially and circumferentially correct mathematical equations when the puzzle is properly assembled. A substantially transparent, rotatable mask may cover the circular pattern. The mask includes preselected opaque areas positioned in spaced radial and circumferential intervals to enable a student to learn mathematics by mentally completing the missing numeral or arithmetic operator. Alternatively, the student may attempt to properly interfit the members to form the circular pattern by appropriate positioning of the numbers and operators, thereby learning and demonstrating an understanding of the equations formed thereon.

In accordance with a second embodiment, a three dimensional educational device includes a plurality of stacked trays maintained spaced apart from each other by a stem projecting upwardly from each tray into a central recess formed in the bottom portion of an adjacent upper tray. Each tray includes a raised center portion defining a circumferential mounting flange extending around the tray. A plurality of block shaped members having an outwardly extending surface with a number or arithmetic operator printed thereon are positioned adjacent each other within each mounting flange to form circumferentially and longitudinally correct mathematical equations.

Still other objects and advantages of the present invention will become readily apparent to those skilled in this art from the following detailed description, wherein I have shown and described only the preferred embodiments of the invention, simply by way of illustration of the best mode contemplated by me of carrying out my invention. As will be realized, the invention is capable of modifications in various obvious respects, all without departing from the invention. Accordingly, the drawings and description are to be regarded as illustrative in nature, and not as restrictive.

BRIEF DESCRIPTION OF DRAWINGS

FIG. 2 is a perspective view illustrating simple and complex puzzle members capable of interfitting to form the circular pattern shown in FIG. 1;

FIG. 3 is a top plan view of the two dimensional educational device shown in FIG. 1 covered with an apertured, rotatable mask;

FIG. 4 is a side view of a three dimensional educational device, in accordance with a second embodiment of the invention, illustrating the outwardly facing surfaces of the block-shaped members having numbers and operators forming longitudinally oriented arithmetic equations;

FIG. 5 is a perspective view of individual block-shaped members having pairs of inclined surfaces formed on an outwardly extending block section;

FIG. 5a is a perspective view of an individual block shaped member similar to the members disclosed in FIG. 5, wherein pairs of inclined surfaces form a four-sided pyramid with a number or operator printed on each side;

FIG. 6 is a perspective view of a single stackable tray, illustrating the fastening stem and circumferential mounting flange formed in the upper surface of the tray;

FIG. 7 is a perspective view of an exemplary two dimensional solution disc developed using the device of FIG. 4 including a central bore for mounting the disc on the upper surface of the stacked tray structure;

FIG. 9 is an exploded side view illustrating the manner of attachment of the tray members forming the three dimensional educational device.

BEST MODE FOR CARRYING OUT THE INVENTION

Figure 1:
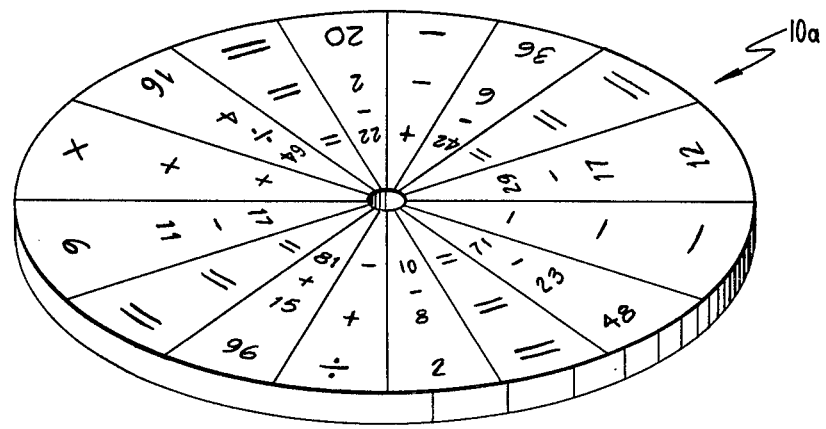
FIG. 1 is a top plan view of a two dimensional educational device in accordance with one embodiment of the invention, illustrating the positioning of puzzle members to form mathematically correct equations in circumferential and radial directions within a circular pattern.

Referring to FIG. 1, the two dimensional educational and puzzle device 10 comprises individual puzzle members 15, properly interfitted together to form a substantially overall circular shape. As shown in FIG. 2, each of puzzle members 15 is formed as a substantially rectangular piece having planar upper and lower surfaces 17, 19, non-parallel, opposite sides 23, 23a and opposite ends 21, 25, preferably arcuate (not shown in detail). The uniform thickness of each member 15 is small compared to its length and width. Because members 15 are formed to enable radial and circumferential adjacent positioning to form a circular shape ends 21, 25 are formed preferably with convex and concave surfaces (not shown), respectively, with outer end 21 having a greater radius than that of inner end 25. Sides 23, 23a are substantially planar and extend radially outwardly from the center C of the completed puzzle (FIG. 1). Members 15 are arrayed in circumferential rows and radial columns, as shown in FIG. 1, with members in each row having identical dimensions.

Members 15 may be formed as simple sector shaped puzzle pieces, in the manner described in connection with FIG. 1, or may be formed as more complex pieces 30 having a shape corresponding to the shape that a number of smaller interfitted pieces 15 would form. In FIG. 2, for example, complex member or piece 30 is constituted by a large wedge shaped portion 31 and a circumferentially projecting portion 33.

A number of arithmetic operator is printed upon upper surface 17 of each member 15. Four members 15 are positioned adjacent each other in a radial direction to define an arithmetically correct equation. Similarly, members 15 are positioned to define circumferentially correct arithmetic equations. As shown in FIG. 1, the two dimensional educational device 10 includes arithmetic equations employing addition, subtraction, multiplication and division operators, enabling students to learn to use such operators in a single device. When properly assembled, a circular mask 35 (see FIG. 3) of greater diameter than the substantially circular pattern may be positioned to cover the equations. Mask 35 is substantially transparent and includes preselected opaque areas 37 positioned in spaced radial and circumferential intervals, to enable the student to learn mathematics by mentally completing the missing numeral or operator. Preferably, opaque areas 37 are spaced apart to cover the same answer to a radial and circumferential equation, thereby simultaneously testing the student's comprehension of two arithmetic operators. For example, as shown in FIG. 1, member 15a includes the printed number "54" as the common answer to radial and circumferential equations "18×3" and "73−19", respectively. By positioning one of opaque areas 37 to cover member 15a and number "54", the student's understanding of, for example, multiplication and subtraction, may be tested simultaneously.

The provision of simple and complex members 15, 30 in a unitary pattern enables device 10 to function as an educational puzzle game. A student's comprehension of arithmetic is tested by requiring the student to assemble the members in a circular pattern with correct arithmetic equations. Device 10, when played as a puzzle, enables the student to interrelate different numbers and operators and further challenges the student's learning capability. The complexity of the puzzle may be varied, for example, by increasing the number of complex members 30 in the game, thereby requiring fewer assembly pieces to form the circular pattern. As the student's comprehension increases additional members 15 may be provided, requiring greater concentration and comprehension of arithmetic operations by the student.

The number of arithmetic equations formed on two dimensional device 10 may be increased by including numbers on lower surface 19 of members 15. By inverting the members, exposing lower surface 19, different radial and circumferential equations are provided to the student.

As an aid to assembling device 10, members 15 may include a position key printed on one of edges 21-25. For example, by printing the letter "A" on members 15 within radial column R (FIG. 1), and letter "B" on members in an adjacent column R′, wherein numbers are printed on members in these columns, and so forth, the relative positioning of the members is easily ascertained.

Figure 8:
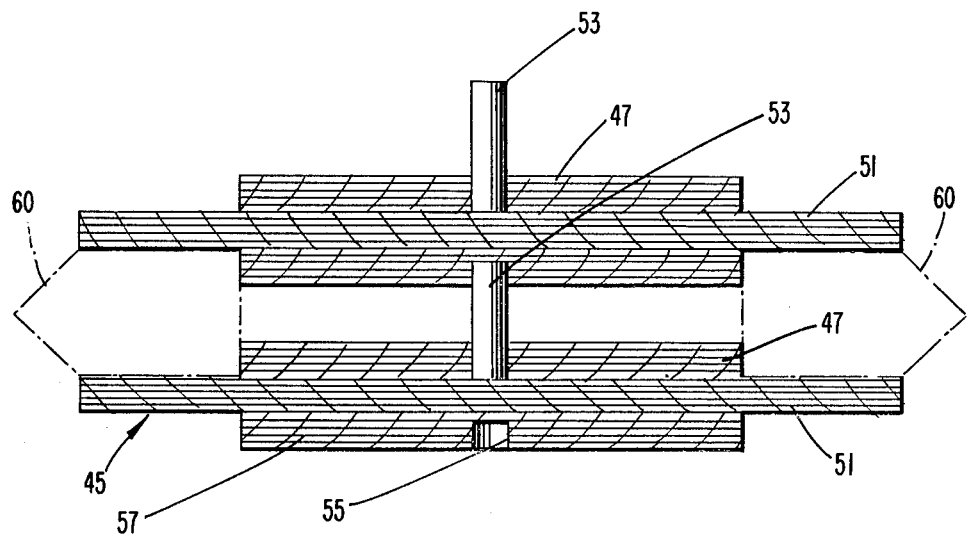
FIG. 8 is a side plan view of two trays in stacked relationship illustrating the stem and recess respectively formed on the upper and downwardly facing tray surfaces in fastened position.

FIG. 4 illustrates a three dimensional educational and puzzle device 40 according to a second embodiment of the present invention. Device 40 comprises a plurality of stacked circular trays 45, each including a central raised hub portion 47 projecting upwardly from upper surface 49 of the tray to define a circumferentially disposed mounting flange 51 extending around the raised hub portion. Mounting flange 51 includes a vertical exterior surface 51a projecting downwardly and meeting upper surface 49. Stem 53 is formed in tray 45 and projects upwardly from the center of the tray (see FIG. 6). As shown in FIG. 8, a recess 55 is formed in the lower surface of tray 45 in coaxial alignment with stem 53. Insertion of stem 53 into a corresponding recess 55 formed in a tray positioned adjacent above the stem enables the trays to be stacked and spaced apart from each other. Upper and lower raised hub portions 47, 57 respectively are dimensioned and spaced apart from each other by stem 53 to enable block members 60 to be positioned between adacent trays 45 upon the lower tray mounting flange 51 to provide stability. Alternatively, stability may be provided by suitably dimensioning the thickness of opposing hub portions 47, 57 of adjacent trays 45 to enable the hub portions to contact each other upon full penetration of stem 53 into a corresponding recess 55.

Block shaped members 60 are formed as substantially rectangular pieces suitable dimensioned for positioning within mounting flanges 51. The blocks may freely rest upon the flanges; alternatively, each block may be provided with two vertically spaced circular recesses 60a,b within rear surface 61 (FIG. 6). Recess 60a is positioned to receive a circular stem portion 51' for stable positioning on the flange. Stem portions 51' are formed to project outwardly from vertical surface 51a and are circumferentially spaced apart from each other for engaging block members positioned in different locations within a tray. If blocks 60 are inverted, discussed below, recess 60b engages stem 51'. Because blocks 60 are secured by stems 51' on mounting flanges 51, the blocks are retained in their proper tray locations.

As shown in FIG. 5, each block member 60 includes an outwardly extending portion 60 integrally formed on outwardly facing surface 64. Portion 62 includes upper and lower inclined surfaces 66, 68, respectively, having numbers and arithmetic operators printed thereon. When members 60 are properly circumferentially positioned within mounting flanges 51 and properly stacked in the manner described supra (FIG. 4), longitudinal and circumferential arithmetically correct equations are formed by the numbers and operators appearing on upper inclined surface 66. By inverting blocks 60 to place lower inclined surface 68 in an upper inclined position, different equations are provided, thereby increasing the number of equations available for aiding the student.

As shown in FIG. 5a, outwardly extending portions 62 may also be pyramid shaped and include four inclined triangular surfaces 62a–d outwardly converging to an apex. A number or operator is printed on each inclined surface. By rotating each of blocks 60 by an angle of 90° to rest upon an orthogonally adjacent side surface, different inclined surfaces 62a–d having different numbers or operators are upwardly positioned, further increasing the number of equations presented in device 40 in relation to the blocks shown in FIG. 5.

In addition to printing numbers or operators on the inclined surfaces of extending portion 62, supra, numbers or operators may also be printed upon the top, bottom and side surfaces of block members 60. Preferably, a number or operator appearing on one of these surfaces corresponds to a number or operator printed upon an inclined surface of a corresponding extending projection 62. In this manner, should a student encounter difficulty with a particular equation in the array, such block members representing the equation may be isolated from the device 40 and explained to the student. Alternatively, different numbers or operators may be printed on the surfaces for forming circumferential and/or radial patterns when interfitted in the manner described for device 10, supra.

As an alternative to rotating block members 60 exposing different inclined surfaces, discussed supra, outwardly extending portions 62 may be provided as separate members, wherein a recess 62a formed on a rear surface of the extending portion is capable of receiving stem 64a projecting outwardly from surface 64. In this manner, extending portions 62 may be rotated for exposing the various inclined surfaces while block 60 remains stationary in a tray location.

Since trays 45 are rotatably stacked in relation to each other, three dimensional educational device 40 may be used in different ways. For example, in simplest form, the assembled structure enables the student to visually observe circumferentially as well as longitudinally correct equations employing different arithmetic operators, in the manner described above. Alternatively, the device may be used as a puzzle or toy by requiring the student to assemble the structure. In addition, the student may be required to rotate trays 45 to properly align block members 60 and form the longitudinally correct equations. Obviously, many modifications are possible within the scope of the inventive concept in order to challenge students of varying degrees of skill and comprehension.

As shown in FIGS. 4 and 9, stackable trays 45 may be mounted upon pedestal 70. The pedestal 70 includes circular support plate 72 and upper circular support plate 74 of smaller diameter parallel to and spaced apart from plate 72 by angled support struts 76. Stem 78 projects upwardly from plate 72 through upper plate 74 and is adapted to mate with recess 55 in a bottom tray 45.

Two dimensional educational device 10a, similar in appearance to device 10 discussed above, is positioned on the upper surface of top tray 45a. Device 10a is provided as an answer key enabling placement of block members 60 into proper tray locations forming correct equations. Alternatively, device 10a may comprise members 15, 30 having different equations than those formed by block members 60, to increase the number of different equations presented within the structure.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

I claim:

1. A two dimensional educational puzzle device, comprising a plurality of interfitting members forming a circular shape when properly interfitted in contact with each other, said members having a plurality of numbers and arithmetic operators printed thereon, said numbers and operators on said members, when properly interfitted, establishing radially and circumferentially correct mathematical equations.

2. An educational device according to claim 1, wherein said interfitting members have shapes such that said members, when properly interfitted, form an array of concentric rings of successively increasing radii.

3. An educational device according to claim 1, wherein said members include a plurality of sector shaped pieces arranged to form said circular pattern when properly interfitted.

4. An educational device according to claim 1, wherein a number or arithmetic operator is located on each of said members.

5. An educational device according to claim 3 or 4, wherein each of said sectors includes four members arranged in a radial direction to form a mathematically correct equation.

6. An educational device according to claim 1, further comprising a substantially transparent mask rotatingly covering said circular shape, said mask having preselected opaque areas positioned in spaced radial and circumferential intervals, to selectively cover or expose particular numbers or arithmetic operators.

7. A three dimensional educational and puzzle device, comprising:

(a) a plurality of block members, each of said members having an outwardly extending surface portion with a number or arithmetic operator printed thereon; and (b) a plurality of circular trays, said trays adapted to be stacked and spaced apart from each other, said members adapted to be positioned upon said trays, the numbers and operators on said outwardly extending block surface portions when said blocks are properly relatively positioned forming mathematically correct equations longitudinally and circumferentially.

8. An educational and puzzle device according to claim 7, wherein each of said trays includes a stem projecting upwardly from an upper surface of the tray, and a recess formed in a bottom surface of the tray adapted to mate with the stem of a lower adjacent tray forming the stacked structure.

9. A three dimensional educational and puzzle device, comprising:

(a) a plurality of circular trays, each of said trays including a raised center portion defining a circumferentially disposed mounting flange;

(b) a plurality of members having an outwardly extending surface with a number or arithmetic operator printed thereon, said members adapted to be positioned within each of said mounting flanges; and (c) fastening means for securing said circular trays in stacked relationship, enabling said outwardly extending surfaces of the members to form circumferential and longitudinal, mathematically correct equations.

10. An educational device according to claim 9, wherein said members have substantially rectangular horizontal cross-sections.

11. An educational device according to claim 10, wherein said outwardly extending surfaces each includes a pyramid shaped projection having outwardly converging inclined surfaces, a number or arithmetic operator being printed on each of said surfaces.

12. An educational device according to claim 9, wherein said fastening means includes a stem projecting upwardly from an upper surface of said circular trays and a recess formed in the lower surfaces of said trays, wherein said fastening means mate to form a rotatable three dimensional array.

13. An educational device according to claim 11, wherein said members are capable of being rotated for selectively exposing different inclined surfaces, thereby increasing and changing the number of arithmetic equations formed in the educational device.

14. An educational device according to claim 7 or 9, wherein said block members each includes a recess formed within a rear surface portion of the block member, and the raised center portion of each of said trays includes a plurality of stem portions outwardly projecting from the raised center portion at circumferential spaced intervals, said recesses adapted to receive said stems for secure attachment of the members within the mounting flanges.

15. A three dimensional educational and puzzle device, comprising:

(a) a plurality of block members, each of said members having a stem portion projecting outwardly from an outwardly facing surface portion of the block member;

(b) a plurality of pyramid shaped portions, each of said pyramid portions having a plurality of outwardly converging inclined surfaces with a number or operator printed on each of the surfaces, and a rear surface including a recess adapted for receiving the stem portions of the block members for securing the pyramid portions to the block members, thereby enabling selective upward positioning of different inclined surfaces by rotating the pyramid portions for forming different mathematically correct equations; and (c) a plurality of circular trays, said trays adapted to be stacked and spaced apart from each other, said members adapted to be positioned upon said trays, the numbers and operators on said inclined surface portions forming mathematically correct equations longitudinally and circumferentially when said blocks are properly relatively positioned within the trays.

* * * * *